United States Patent Office 2,773,074
Patented Dec. 4, 1956

2,773,074

PROCESS FOR THE PRODUCTION OF ALLOPREGNANE-3β, 11β, 17α, 20β, 21-PENTOLS

Carl Djerassi, Birmingham, Mich., and George Rosenkranz, Mexico City, Mexico, assignors, by mesne assignments, to Syntex S. A., Mexico City, Mexico, a corporation of Mexico No Drawing. Application July 30, 1952,
Serial No. 301,802

Claims priority, application Mexico August 1, 1951

9 Claims. (Cl. 260—397.5)

The present invention relates to a novel method for the preparation of cyclopentanophenanthrene derivatives. More particularly the present invention relates to a novel process for the reduction of certain allopregnan compounds having keto groups in at least the 11 and 20 positions in order to prepare therefrom allopregnan-3β-11β, 17α, 20β, 21-pentol also known as Reichstein's substance A. The compound just referred to has been isolated by Reichstein and other investigators from the human organism and is therefore a naturally occurring substance. Up to now however, this substance had not been successfully synthesized.

In the U. S. patent application of Pataki and Kaufmann, Serial No. 225,460, filed in the United States Patent Office on May 9, 1951 there is disclosed the preparation of allopregnan-3β, 17α, 21-triol-11, 20-dione (Reichstein's compound D) and/or its 20 monoacetate. In the U. S. patent application of Pataki and Kaufmann, Serial No. 200,877 filed December 14, 1950 there is disclosed the production of allopregnan-17α, 21-diol-3,11,20-trione and/or its esters.

It has now been found that, in accordance with present invention that lithium aluminum hydride reduction of the compounds just before referred to results in the preparation of allopregnan-3β, 11β, 17α, 20β, 21-pentol i e. Reichstein's substance A. In other words it has been discovered that in these compounds and/or their esters the reduction of the 11 keto group and 20 keto group according to this invention results in the proper optical isomer i. e. the 11β, 20β hydroxy groups. Further, the surprising discovery was made that even when there is present three keto groups i. e. at the 3, 11 and 20 position the reduction takes place in the correct stereochemical path to yield the desired, β, β, β-isomer.

The following equation serves to illustrate the present invention:

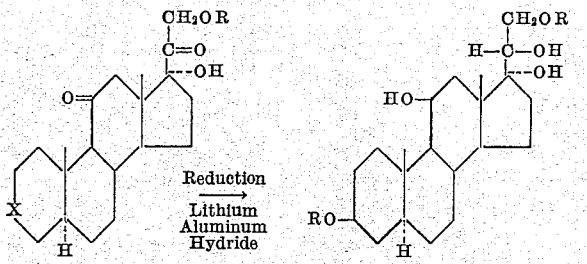

In the equation R represents hydrogen or an acyl group i. e. the residue of any acid normally used for the esterification of steroids, as for example, the acyl group may be the residue of a lower fatty acid or benzoic acid. In the above equation further, X represents C=O and CH—OR and R has the same significance as previously set forth.

The process of the present invention may be practiced in general by dissolving a suitable compound such as allopregnan-17α, 21-diol-3,11,20-trione 21-monoacetate in a suitable solvent such as tetrahydrofurane and adding this solution to a similar solution of lithium aluminum hydride in tetrahydrofurane, the mixture is then refluxed for a short period of time as for example 30 minutes and the excess reagent decomposed, as for example, with acetone. The reaction mixture is then diluted with water, extracted with a suitable solvent, washed, dried and evaporated to dryness. The residue is allopregnan -3β, 11β, 17α, 20β, 21-pentol (Reichstein's substance A). The residue can be purified or in the alternative it may be directly esterified as for example, acetylated with acetic anhydride and pyridine and after suitable purification, as by chromatography and recrystallization, produced the corresponding triacetate of Reichstein's substance A.

The following specific examples serve to illustrate but are not intended to limit the present invention:

Example 1

A solution of 1 g. of allopregnan-17α, 21-diol-3,11, 20-trione 21-monoacetate in 100 cc. of tetrahydrofurane was slowly added to a solution of 1 g. of lithium aluminum hydride in 50 cc. of tetrahydrofurane. The mixture was refluxed during 30 minutes and then acetone was added to decompose the excess reagent. The mixture was diluted with water (without the addition of acid), extracted with chloroform, washed, dried and evaporated to dryness. The residue of the pentol (allopregnan-3β, 11β, 17α, 20β, 21-pentol) was directly acetylated with acetic anhydride and pyridine by heating the solution 1 hour on the steam bath. The product was purified by chromotographing through a column of ethyl acetate washed alumina. The fractions eluted with a mixture benzene-chloroform (4:6) were combined and the product was recrystallized from acetone-ether to yield 0.48 g. of colorless crystals of the triacetate of allopregnan-3β, 11β, 17α, 20β, 21-pentol M. P. 215–216° C. $(\alpha)_D$ +66° (acetone), +74° (chloroform).

The starting material for this example can also be the free compound allopregnan-17α, 21-dial-3, 11, 20-trione instead of the acetate, the same result being obtained.

Example 2

A solution of 1 g. of allopregnan-3β, 17α-21-triol-11,20-dione (Reichstein's compound D) in 100 cc. of tetrahydrofurane was slowly added to a solution of 1 g. of lithium aluminum hydride in 50 cc. of tetrahydrofurane. The mixture was refluxed 30 minutes, acetone was added to decompose the excess reagent and then the mixture was diluted with water (without the addition of acid). The product was extracted with chloroform and washed with water, dried and evaporated to dryness. The pentol allopregnan-3β, 11β, 17α, 20β, 21-pentol left as a residue was acetylated by heating one hour on the steam bath with acetic anhydride and pyridine. The product was purified by chromotographing through a column of ethyl acetate washed alumina. The fractions eluted with benzene chloroform (4:6) were combined and crystallized from acetone-ether to yield 0.51 g. of colorless crystals.

We claim:

1. A process for the production of a compound of the following formula:

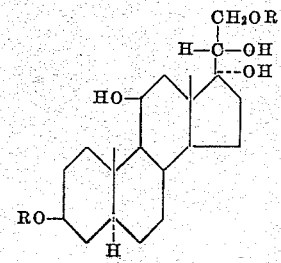

wherein R is selected from the group consisting of hydrogen, a lower fatty acid acylate and benzoate, which comprises subjecting a compound of the following formula:

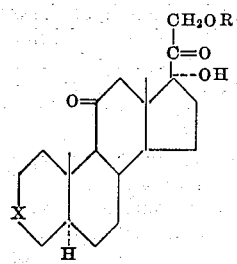

wherein R represents the same group previously set forth and X is selected from the group consisting of C=O and CH—OR, to reduction with lithium aluminum hydride.

2. A process for production of allopregnan-3β, 11β, 17α, 20β, 21-pentol which comprises reducing allopregnan-17α, 21-diol-3,11,20-trione with lithium aluminum hydride.

3. A process for the production of allopregnan-3β, 11β, 17α, 20β, 21-pentol, which comprises reducing a 21 monoester selected from the group consisting of lower fatty acid esters and benzoic acid ester of allopregnan-17α, 21-diol-3, 11, 20-trione with lithium aluminum hydride.

4. The process of claim 3 wherein the ester is an acetate.

5. A process for production of allopregnan-3β, 11β, 17α, 20β, 21-pentol which comprises reducing allopregnan-3β, 17α, 21-triol-11, 20-dione with lithium aluminum hydride.

6. The process for production of allopregnan-3β, 11β, 17α, 20β, 21-pentol which comprises reducing a 21 monoester selected from the group consisting of lower fatty acid esters and benzoic acid ester of allopregnan-3β, 17α, 21-triol-11, 20-dione with lithium aluminum hydride.

7. The process of claim 6 wherein the 21 monester is an acetate.

8. A process for the production of allopregnan-3β, 11β, 17α, 20β, 21-pentol which comprises reducing a 3,21-diester selected from the group consisting of lower fatty acid esters and benzoic acid ester of allopregnan-3β, 17α, 21-triol-11, 20-dione with lithium aluminum hydride.

9. The process of claim 8 wherein the 3, 21-diester is a diacetate.

References Cited in the file of this patent

UNITED STATES PATENTS

| | | |
|---|---|---|
| 2,541,105 | Sarett | Feb. 13, 1951 |
| 2,576,311 | Schlesinger | Nov. 27, 1951 |
| 2,628,966 | Graber | Feb. 17, 1953 |
| 2,671,095 | Levin | Mar. 2 1954 |

OTHER REFERENCES

Euw et al.: Helv. Chim. Acta 25, 990–91 and 1009–10 (1942).

Chaiken et al.: JACS 71, 122–25 (1949).